United States Patent
Colligan et al.

(10) Patent No.: US 6,519,762 B1
(45) Date of Patent: Feb. 11, 2003

(54) METHOD AND APPARATUS FOR RESTORATION OF A COMPUTER SYSTEM HARD DRIVE

(75) Inventors: Tom Colligan; Jonathan Ellis; Hunter Robertson, all of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/211,943

(22) Filed: Dec. 15, 1998

(51) Int. Cl.$^7$ .............................................. G06F 9/445
(52) U.S. Cl. ............................................. 717/11; 717/2
(58) Field of Search ....................... 717/2, 11

(56) References Cited

U.S. PATENT DOCUMENTS

| | | | |
|---|---|---|---|
| 5,613,059 A | 3/1997 | Stallmo et al. | 395/182.04 |
| 5,666,411 A | 9/1997 | McCarty | 380/4 |
| 5,745,568 A | 4/1998 | O'Connor et al. | 380/4 |
| 5,745,669 A | 4/1998 | Hugard et al. | 395/182.01 |

FOREIGN PATENT DOCUMENTS

| | | |
|---|---|---|
| EP | 0794484 A2 | 9/1997 |
| GB | 2339488 A | 1/2000 |

*Primary Examiner*—Mark R. Powell
*Assistant Examiner*—Michael B. Holmes
(74) *Attorney, Agent, or Firm*—Michael J. Balconi-Lamica; Haynes and Boone, LLP (57) ABSTRACT

A computer system having capability for restoration of a hard disk drive includes at least one processor and at least one hard disk drive. A software image is stored on the at least one hard disk drive, the software image including a factory downloaded image which is subject to corruption. A protected software restoration image not prone to a typical corruption is stored on the at least one hard disk drive and available for use by the at least one processor in executing the restoration of the software image on the at by least one hard disk drive to a like new factory downloaded image condition.

34 Claims, 3 Drawing Sheets

METHOD AND APPARATUS FOR RESTORATION OF A COMPUTER SYSTEM HARD DRIVE

CROSS REFERENCE TO CO-PENDING APPLICATIONS

This application relates to co-pending U.S. patent application Ser. No. 08/984,357, filed on Dec. 3, 1997, entitled "Utilize 1394 Ports On Back Of System For Faster Install Of System Software In Factory", naming Thomas Colligan et al. as inventor. The co-pending application is incorporated herein by reference in its entirety, and is assigned to the assignee of the present invention.

This application relates to co-pending U.S. patent application Ser. No. 09/066,128, filed on Apr. 24, 1998, entitled "Software Transport Mechanism", naming Thomas Colligan et al. as inventor. The co-pending application is incorporated herein by reference in its entirety, and is assigned to the assignee of the present invention.

BACKGROUND

The disclosures herein relate generally to computer systems, and more particularly, to restoration of a hard drive of a computer system.

A hard disk drive (HDD) is characterized by storage addresses ranging from a zero address to a maximum address. At the bottom of a hard disk drive, there is a typically at least one cylinder and a master boot record. The master boot record informs the computer system how to boot-up, and where all the files are. The master boot block record contains file allocation tables (FAT). A file allocation table is a table with information about all of the files, data, their sizes, and locations on the hard disk drive. Depending on the type of file system being used, the HDD will be partitioned into several partitions, such as C: drive and D: drive or as a single partition, for example, C: drive. For a FAT 32 file system, the HDD includes one large partition. For any given computer system, an original factory downloaded software image (i.e., resident software) of the computer system typically resides in the lower address portion of the HDD.

At the end of completion of a computer manufacturing process of a given computer system, downloaded to the computer system HDD is what is referred to herein as the factory download or factory downloaded software image. The factory downloaded image thus includes the hard disk drive image as it existed at the time the computer system was shipped from the factory, prior to an initial installation by a customer or user.

Upon receipt of a computer system by a customer, the customer must first install the operating system according to the requirements of the respective operating system. The customer may also install third party software and hardware and software drivers for the hardware, in addition to performing other installations and/or modifications to the original factory downloaded image stored on the hard disk drive. In the course of doing the installation of the software by the customer, the factory download software image may often become corrupted to a major or minor degree. Such corruption might occur for a variety of reasons, for example, as a result of incompatibility between various versions of software. A customer may also inadvertently reformat the hard disk drive without first making a back-up copy of the factory download. A virus may also have been introduced which corrupts the factory download.

Altering the factory download image might also include, for example, a situation where a customer attempts to install a modem which was successfully used in a previous system, and further which is not compatible with current plug-n-play requirements for the operating system and/or the interrupt allocations off the system bus of the new computer system. In such an instance, the operating system of the new computer can become corrupted to the point of where the operating system will no longer run. Still other user activities may corrupt the system in such a manner that the computer system will not function properly when booted-up from the hard disk drive, i.e., the hard disk drive is sufficiently corrupted that the HDD must be completely erased and then restored from the beginning, starting the software installation process over again.

With generic configured computer systems, a customer can purchase a particular operating system (WINDOWS 95™, 98™, NT™) and either a GAME PACK or a BUSINESS PACK software package, which are about the extent of the purchase options of a generic configured computer system. If a customer purchases a particular monitor, the generic system is typically set-up for 640×480 resolution, which may be other than the resolution of the purchased monitor. A set of diskettes containing drivers needed to upgrade the computer system to the driver which will enable the customer to actually use the particular equipment purchased, are then needed to be installed on the computer system. The same applies to particular printer, video card, sound card, etc. In view of one or two generic configurations, a computer manufacturer can easily mass produce generic restore images on a restore CD-ROM, for example, for shipment with each generic computer system.

With built-to-order computer systems, the factory download includes the operating system, applications, hardware and software drivers, etc., as ordered by a customer or needed to support hardware ordered by the customer. Upon an initial power on of the computer by a customer, the user is instructed to install the operating system (Windows 95™, Windows 98™, Windows NT™, or other operating system). Basically, installation of the operating system may include simply the entering of a certificate of authenticity number(s) when requested and implementing other registration and user selectable preferences which may be required. The installation can also include installation of any major software application(s) which were also ordered/purchased with the computer system. Such an installation process can significantly affect or change the original factory download software image (i.e., corrupt the image). That is, during installation certain files may be changed from a compressed state to a de-compressed state, files could become linked with other files, etc., all as a result of the software installation carried out by the customer. The actual image size of the factory download can become larger as a result of the carrying out of the install process. The installation further includes customization of various components, programs, etc., according to user preferences.

For a built-to-order system, any number of variations of factory download software configurations can be realized. For instance, if a particular video card is ordered, then the software driver for that video card is installed on the HDD at the factory. With custom built-to-order computer systems, not only will the customer be sold hardware and software, but the computer system will be configured specifically to the hardware and software items that the customer specifically purchased according to a particular customer configured computer system. In addition, built-to-order computer systems include unique factory download image, one each of a particular built-to-order computer system. In the event of a single customer configuring and purchasing two identical computer systems, the factory download software image stored on the HDD will be individualized for each system because each computer system will be keyed to a unique service tag number burned into each particular computer system.

As mentioned above, one method for restoration of a software image may include a CD ROM based option in which some form of CD ROM is used to distribute the needed restoration software image. The CD ROM option is divided into two major subclasses, either a generic pressed CD ROM made in large numbers, or a recordable CD ROM that is semi-custom prepared for each individual computer system. The generic approach is used by most all computer manufacturers, with only a respective computer system platform specific bundle being available for restoring. The industry standard trend of shipping a generic restore CD ROM with each system is not readily applicable in the instance of custom built-to-order computer systems. The software considerations of custom built-to-order computer systems make this option viable only if the manufacturer foregoes the ideal of restoring the system to the computer system's actual "like factory new" configuration with all of the software that the customer originally purchased.

In view of the unique HDD image of the customer configured built-to-order computer systems, the method of mass producing a generic restore image is not helpful. A restore CD ROM having a generic image will not be very useful for restoring the unique image of the built-to-order system. Creation of a unique CD ROM containing a software restoration image per customer configured built-to-order computer system for shipment with the built-to-order computer system would be needed, however, such a remedy is an unreasonably expensive and time-consuming proposition.

In other words, with built-to-order computer systems, if required to actually restore the hard disk software image using a restore CD ROM, the computer manufacturer would need to produce a customized version for each computer system. The restore CD ROM would need to reflect the unique combinations of operating system, bungled software sets and third party software products that the customer may have purchased for the given built-to-order computer system, installed on the restore CD ROM. This requires a fairly significant "just in time" CD ROM production system installed in the factory, or else a method to pre-produce custom CD ROMs and distribute them to the appropriate computer systems during the computer system manufacturing process.

Furthermore, in the manufacture of computer systems, in particular built-to-order systems, a computer manufacturer may desire to implement a policy for replacing a customer's hard disk drive (HDD) within an initial 30 days of system ownership for either of two general reasons. The first reason is if there is something physically "wrong" with the HDD due to workmanship or handling damage. A hardware failure can be characterized by the hard disk drive being completely non-responsive. In such an instance of hard drive failure, a replacement HDD is prepared and sent to the customer for replacement. The second reason is if there is something "wrong" with the software image that resides on the HDD. This second reason, relates to so-called STM (Software Transport Mechanism) dispatches and may constitute well in excess of two thirds of all of a monthly HDD initial field incident rate (IFIR) dispatches for the computer manufacturer. IFIR is a metric used to measure a number of failure incidents of a product, i.e., computer system, within a first 30 day period of use in the field by a customer.

In an effort to maximize customer satisfaction, a computer manufacturer can proactively provide customers with a restore disk image capability, in the event their computer system suffers a catastrophic loss/corruption of respective HDD file/data, for any reason, within the initial 30 days of product ownership. Currently, this need is addressed by restoring, at the manufacturer's facility, the customer's "like factory new" disk image on a new disk drive and then sending the new disk drive to the customer for replacement of their fully operational, but software corrupted, hard disk drive. The dispatch of a third party maintenance (TPM) person is also required in order to install the new disk drive and to ship the old drive back to the manufacturer.

The above outlined process involves a number of expenses, some obvious, some less so. The costs of the additional hard disk drive, the dispatch of the TPM call and the transportation charges for the drives, to and from, are easily understood. Less obvious are the extensive handling and testing costs incurred by the manufacturer in processing the very large number of returned drives that have no identifiable fault. Also less quantifiable, but potentially very significant, is the extended time that a technician must spend to extensively verify the probable software fault in order to justify the dispatch of such an expensive part.

The secondary costs, while more difficult to see and quantify, are at least 'direct costs', and therefore likely to be examined. There are indirect costs potentially even more important. Given a "flood" of drives being returned, real IFIR incidents are difficult to spot, trends that should initiate corrective action programs are hidden amidst the deluge, and analysis is foregone in favor of keeping up with incoming paperwork. The true hidden costs of this false STM based IFIR has been to keep the manufacturer from clearly seeing and addressing the underlying true HDD IFIR causes/trends/distribution.

Various alternatives for proactive distribution of hard disk restore images have been considered which include the use of second HDDs and the use of tape back up units of numerous size and performance scales. The use of ZIP files/drives, removable HDD sub-systems have also been considered. Modem, Internet and on-line services download options have also been explored. Even the number of floppy disks required for worst case situations has been calculated, for instance, wherein just in excess of 250 disks would be needed if uncompressed, compared to approximately 180 if compressed using a Zip drive. Still further, issues of media cost, lack of market penetration of supporting peripherals, unwidely operational characteristics and/or customer acceptance has led to disqualifying most of these proposed options as not feasible or desirable.

It would thus be desirable to provide a solution to the above problems, in particular, a method and apparatus for providing economically feasible HDD factory download image recovery for a computer system.

SUMMARY

According to one embodiment, a computer system having capability for restoration of a hard disk drive includes at least one processor and at least one hard disk drive. A software image is stored on the at least one hard disk drive, the software image including a factory downloaded image which is subject to corruption. A protected software restoration image not prone to a typical corruption is stored on the at least one hard disk drive and available for use by the at least one processor in executing the restoration of the software image on the at least one hard disk drive to a like new factory downloaded image condition.

The embodiments of the present disclosure advantageously provide that many of the costs, direct and indirect, previously incurred in connection with the restoration of a hard disk drive software image can now be avoided. A hard disk drive hidden software restoration image is sent along with a given computer system when initially delivered to a customer, so as to be readily available if a need arose to return the hard disk drive unit to "like new factory downloaded" software condition. The method and apparatus furthermore allow a customer service technician to direct the customer to initiate a restore process immediately, instead of having the customer wait a day (or more) while the manufacturer produces and ships a replacement HDD and/or restoration image CD-ROM. Similarly, a customer can also individually initiate a restore process in accordance with the present disclosure without assistance of the customer service technician.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which.

DETAILED DESCRIPTION

Figure 1:
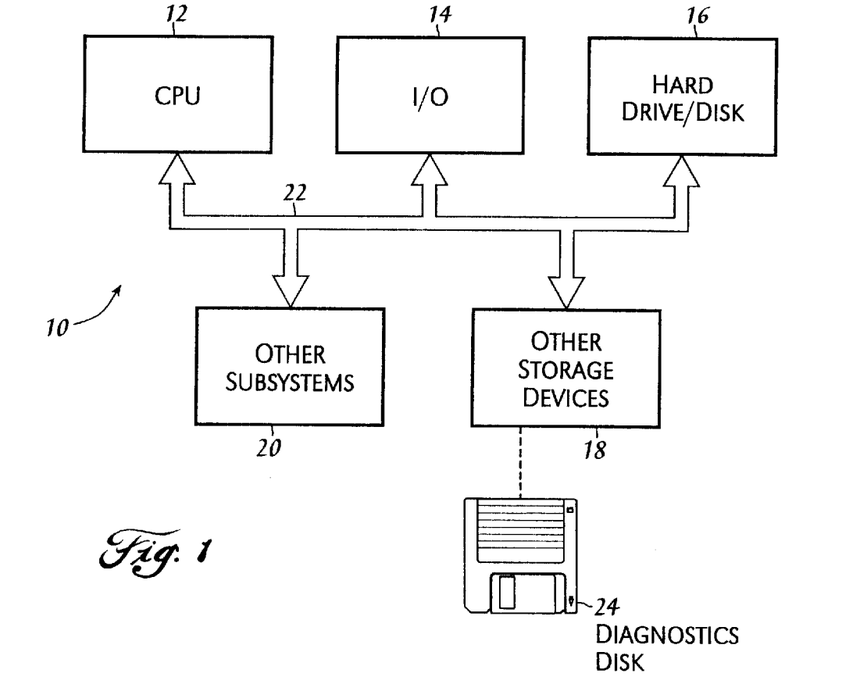
FIG. 1 illustrates a block diagram of a computer system according to the embodiments of the present disclosure.

Referring now to FIG. 1, a system block diagram of a computer system 10 is shown having features thereof configured in accordance a customer configured computer system order as discussed herein. The computer system 10 includes at least one central processing unit (CPU) 12, input/output (I/O) devices, such as a display, a keyboard, a mouse, and associated controllers, collectively designated by a reference numeral 14, at least one hard disk drive 16, and other storage devices, such as a may include a floppy disk drive, CD-ROM drive, and other memory devices, collectively designated by a reference numeral 18, and various other subsystems, such as a network interface card (or NIC), collectively designated by a reference numeral 20, all interconnected via one or more buses, shown collectively in FIG. 1 as a bus 22. A diagnostics diskette 24 is included also, as discussed herein.

The present embodiments provide for restoration of a factory downloaded software image. The present embodiments further provide an alternative and/or complementary method and apparatus to a current software transport mechanism (STM) program with respect to use of a custom CD-ROM based restore disk image, further wherein the software restoration image of the present embodiments may be easily implemented with a customer's computer system at the time of manufacture. A custom CD-ROM based restore disk image usage is not preferred for use with all computer systems being manufactured since there exists time to market (TTM) and distribution problems which are advantageously overcome by the alternative and/or complementary scheme of the present disclosure.

According to the embodiments of the present disclosure, a restore image is distributed as a hidden or protected software restoration image file, in compressed format, on the customer's hard drive at time of initial installation or factory download. The hidden compressed software image can be restored to the hard disk drive of the computer system with the use of a restoration utility program. The restoration utility program can be contained on a diagnostics diskette and/or the hard disk drive of the customer built-to-order computer system. The hidden restoration software image file method and apparatus, as discussed herein, while not as comprehensive as the CD-ROM based solution, has the significant advantages of involving no additional hardware costs. It has the further advantage of being applicable to computer system platforms that do not have 100% CD reader attach rates.

The hidden and/or protected software restore image embodiment, referred to herein as zero incremental goods/zero additional garbage (ZIG/ZAG), is believed to be able to provide, by itself, on the order of 80% of the STM IFIR reduction benefits of the CD-ROM solution, only much sooner, at a significantly reduced cost, and which is suitable for every computer system platform, even if the computer system does not have a CD reader attached. Used in conjunction with a STM CD-ROM "dispatched as needed" program, the ZIG/ZAG restoration program can provide 100% STM IFIR solution coverage.

The method and apparatus of the present disclosure use the computer system's hard drive itself to carry a back-up copy of the computer system's hard drive factory downloaded software image configuration as it exists just before the customer initiates a "break-the-seal" and begins the customer portion of the computer system install cycle. A combination of the ZIG/ZAG restoration and the CD-ROM based restoration (dispatched as needed) provide for the best combination of TTM and proactive IFIR reduction. That is, the ZIG/ZAG restoration solution can be implemented for use with custom manufactured built-to-order computer systems, further being supplemented with a CD ROM based restoration solution only as may be required for a particular circumstance. The ZIG/ZAG restoration advantageously provides significant cost reduction, flexibility and TTM for providing like new factory downloaded software image restoration for custom manufactured computer systems.

In accordance with the present disclosures, the custom built-to-order computer system's HDD hosts a backup copy of the factory download software image and includes a number of available sub-options. Based upon requirements and choice of modes of implementation, several design options include: i) compressed/uncompressed file storage and method of compression; ii) hidden/"deeply hidden" file indexing with respect to a visibility of the software restoration image file by computer's operating system; iii) encrypted/non-encrypted protection schemes, including a choice of encryption method; iv) software restoration image creation at the time of factory manufacturing; and, v) methods of restoration activation.

The present embodiments have the advantage that a customer is very unlikely to readily corrupt a deeply hidden software restoration image, as discussed herein. The deeply hidden image further provides advantage in that it is resident on the HDD in a form and format which makes the image very unlikely to be destroyed and/or corrupted. The deeply hidden image is not prone to the ills of a normal corruption. In the event of the user reformatting the HDD, the hidden image will remain unaffected. Because the image is not visible to the operating system, reformatting the hard disk drive does not remove it. Re-partitioning of the hard disk drive does not remove the deeply hidden image either. Furthermore, most viruses can not find the deeply hidden image. Deeply hidden does not merely imply the setting of a "hidden" bit somewhere, nor does it imply that the file was written somewhere and then deleted. The protected software image is thus not prone to a typical corruption. The software restoration image is protected from the vast majority of processes and conditions which induce corruption.

Other ways of providing protection are possible. Protecting the restoration software image can be facilitated by placement of the restoration software image in an area of the hard disk drive that is not allocated. That is to say, all hard drives have a master boot block record that may allow for up to four partitions. The restoration software image can be protected by modifying the master boot block record so that the space in which the restoration image is located is not otherwise visible to any process making use of the master boot block record. In addition, there is a small area between the end of the master boot record and where the files or FATs begin. This small area is typically not used and is otherwise referred to as a dead sector(s). Other unallocated sectors or portions of the hard disk drive may also exist. In one of the present embodiments, a dead sector or unallocated sector, is used to write the location of where the software restoration image begins in the hard disk drive. The information necessary for identifying the location of the software restoration image can thus be stored in a dead sector or an unallocated portion of the hard disk drive. In addition, the location information can be coded or encrypted according to a prescribed encryption scheme such that the location information is furthermore not readily recognizable by viruses or other typical programs. The encrypted location information further adds to a level of security or protection of the hidden software restoration image.

As mentioned, the factory downloaded software image on the HDD is prone to corruption from a variety of sources. The present embodiments advantageously provide a method to restore the factory downloaded software image with the use of the protected software restoration image stored on the hard disk drive. The protected software restoration image stored on the hard disk drive is essentially the same (except for being compressed) as the software image downloaded to the hard disk drive during manufacture of the computer system. Several ways of making the software restoration image protected can include making the restoration image deeply hidden, placing the restoration image in an unpartitioned area of the hard disk drive, and placing the restoration image in a partitioned area with non-standard encoding (e.g., encrypted) or other non-standard procedures implemented with respect to the pointers in the master boot block record that indicate where things are on the hard disk drive and how the pointers are used. There are standard codes which indicate to any given program what kind of partition a given partition is. With the present embodiments, non-standard codes are used to indicate that a given partition is an empty, blank, or non-standard partition, wherein typical programs, including viruses would not know what to do with such an empty, blank, or non-standard partition.

Figure 2:
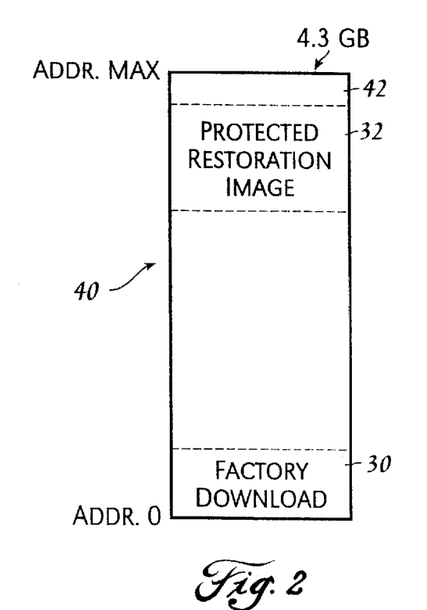
FIG. 2 is a layout diagram of a hard disk drive of the computer system of FIG. 1 including the protected software restoration image according to one embodiment of the present disclosure.
Figure 3:
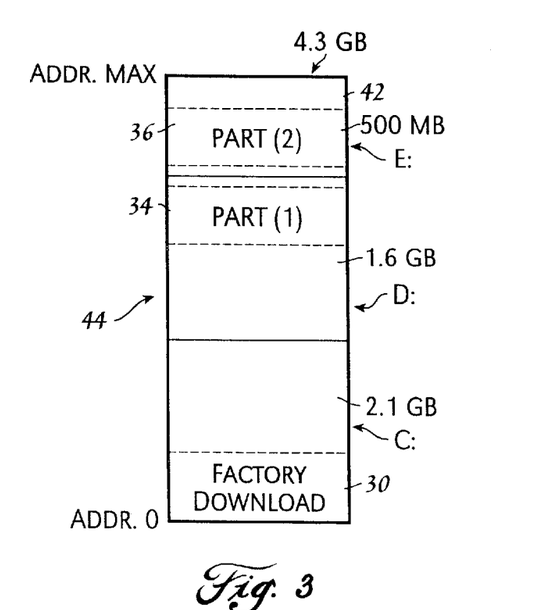
FIG. 3 is a layout diagram of a hard disk drive of the computer system of FIG. 1 including the protected software restoration according to another embodiment of the present disclosure.

Referring now to FIGS. 2 and 3, the software restoration image 30 can include one single contiguous image 32 or multiple non-contiguous portions (34,36) of the complete software restoration image. For example, a 4.3 Gbyte hard disk drive 40 can include a single partition using the FAT 32 file type. In such an instance, the software restoration image 32 can be a contiguous image (FIG.2). To avoid being overwritten, a buffer zone 42 is added at the top of the hard disk drive memory, the buffer area 42 being subject to use by certain programs for temporary storage (e.g., a disk defragmentation program). For the FAT 32 file type, 4.2 GBytes can be accessed per partition. For the FAT 16 file type, only 2.1 Gbytes per partition are allowed.

For a similar 4.3 Gbyte hard disk drive 44 of FIG. 3 using a FAT 16 file type, however, the hard disk drive will contain multiple partitions (e.g. C: drive, D: drive and E: drive). The C: drive partition may include a 2.1 Gbyte partition, the D: drive partition a 16 Gbyte partition, and the E: drive partition a 500 MByte partition. In this instance, if the factory downloaded software image 30 includes 700 Mbytes, then to avoid writing over partition boundary lines, the protected software restoration image (34, 36) is made non-contiguous (FIG.3). A first portion 34 of the protected software restoration image can be placed in the E: drive partition and a remaining portion 36 placed in the top portion of the D: drive partition. Other partitioning and portioning of the protected software restoration image in select portions are possible, preferably in portions of partitions not highly likely subject to a normal use during a period of initial system use by a customer, for example, during a first thirty days of initial system usage by the customer.

As a result of the protected software restoration image being deeply hidden, at some point in time, as a customer fills up more and more of the hard disk drive with data and/or program files, the protected software restoration image becomes more likely to be overwritten. Such an occurrence of filling up the entire hard disk drive with program and data files within, for example, an initial 30 day period (maybe longer) of customer usage (the initial customer usage period) is believed to not be a typical occurrence, and thus the integrity of the protected software restoration image during the initial customer usage period being maintained is highly probable. The protected software restoration image is not visible and thus is subject to being overwritten at some point in time of the customer's usage of the computer system.

Figure 4:
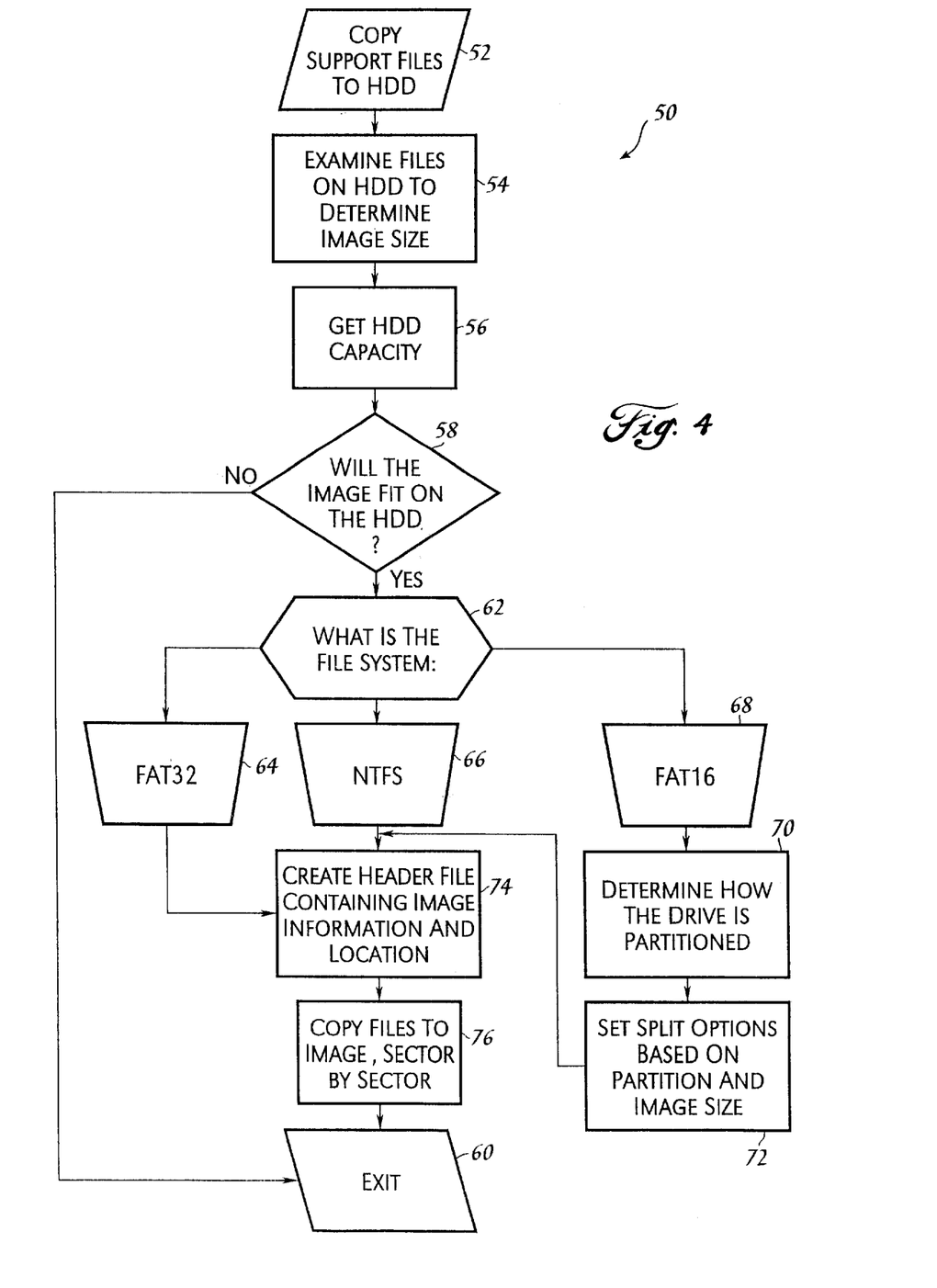
FIG. 4 is a flow diagram of the creation of a protected software restoration image according to an embodiment of the present disclosure.
Figure 5:
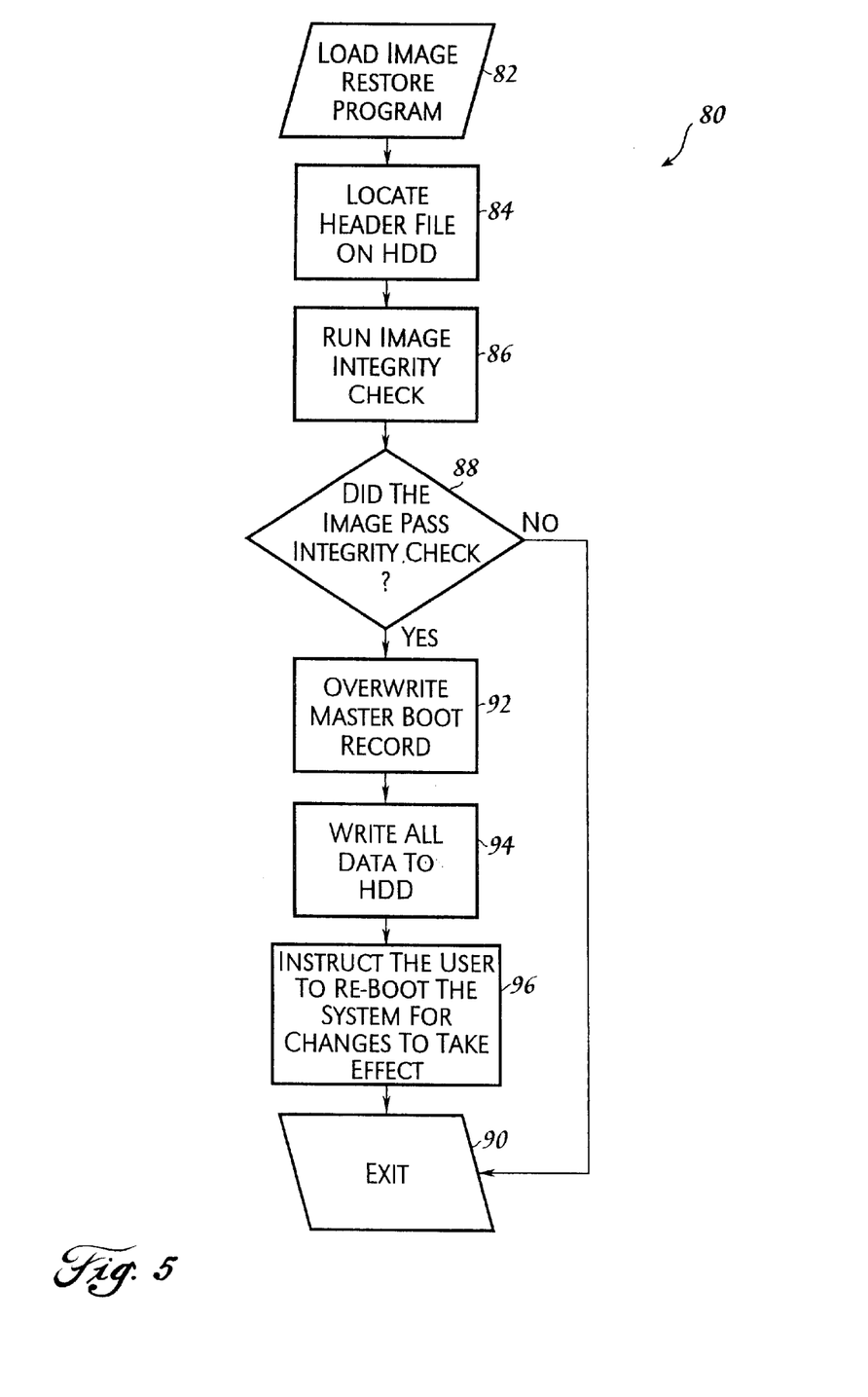
FIG. 5 is a flow diagram of the restoration of the software image with the protected software restoration image according to an embodiment of the present disclosure.

Restoration of a hard disk drive factory downloaded software image includes two main components. The first component includes taking a "picture image" of a customer's unique computer system hard disk drive software image, compressing the image, and placing the compressed image on a furthest available partition (e.g., the "TOP" of the hard disk drive) or otherwise protecting the image as further discussed herein (FIG. 4). The creation of the "picture image" is performed at the factory or computer manufacturer prior to shipment of the particular computer system to the customer. The second component of the hard disk drive restoration includes a customer/technical support interface and execution of a restoration utility program (FIG. 5). The customer's computer system is preferably shipped with a customer diagnostics diskette. According to one embodiment, a hidden/system file called ZZ.BAT which includes the restoration utility program resides on the diagnostics diskette. The purpose of the restoration utility program is to verify the integrity of the software restoration image that was created at the factory for the given computer system and to use the software restoration image to create a "like new" factory downloaded software image on the hard disk drive. The restoration utility program includes instructions for causing the at least one processor to execute the restoration of the software image on the at least one hard disk drive. The restoration utility program can be programmed with suitable programming code for performing the various functions as discussed herein, using programming techniques known in the art. In accordance with the embodiments, a software transport mechanism having the restoration program disposed thereon is also provided. The software transport mechanism can include either one or both of the hard disk drive and the bootable diagnostics diskette.

Turning now to FIG. 4, one embodiment 50 for the creation of the protected software restoration image of the factory downloaded software image will now be briefly discussed. In a first step 52, prescribed support files are copied to the HDD as may be required. The factory downloaded software image files on the HDD are examined to determine an image size of the factory downloaded image in step 54. Next, the HDD capacity is determined, step 56. In a next step 58, an inquiry is made as to whether or not the image will fit on the HDD. If the restoration image will not fit on the HDD, then the restoration image process terminates or exits at step 60. Given that the restoration image will fit onto the HDD, then in step 62, an inquiry is made as to what is the file system type. If the file system type is FAT32, then the process proceeds with step 64. If the file system type is NTFS, then the process proceeds with step 66. If the file system type is FAT 16, then the process proceeds with step 68. For the FAT 16 file type, the process includes a determination of how the HDD is partitioned in step 70. Upon determination of the partitioning, in step 72, split options are established based upon the partition sizes and restoration image size, the established split options for use during subsequent steps. In step 74, a header file is created on the HDD, the header file containing image information and location. In step 76, the files of the factory downloaded image are copied, in compressed form, to the restoration image on the HDD, sector by sector. Upon a completion of copying of all file, the software restoration image creation process terminates or exits at step 60. Variations to the image creation process can be implemented, as may be required for a particular image creation.

According to another embodiment, a compressed, piracy protected, software restoration image is created as part of the customer installation process and then "deeply hidden" such that the software restoration file does not appear in the computer system's file directory. In this embodiment, the creation process is part of the "housekeeping" done before the customer "breaks-the-seal" with respect to an initial installation process. The factory download software image restoration process is preferably initiated by the activation of the restoration utility program, further as discussed herein. The restoration utility program is added to the computer system diagnostic diskette and/or to the computer system hard disk drive at the time of computer system manufacture.

Placing a compressed version of a computer system's initial factory download software image onto the computer system hard disk drive itself for use in the restoration of the factory download software image might raise the following concerns. A compressed software restoration image would consume between 100 and 200 megabytes of storage on the computer hard disk drive. The software restoration image file could also become corrupted by the same actions that damaged the original factory downloaded software image on the hard disk drive. The software restoration image file could be transferred to another system, or posted to a bulletin board service or the Internet for use on other systems. If the factory downloaded software image of the operating system, or its file structure, becomes corrupted, then the software restoration image file might be thereafter inaccessible. Also, a customer might "accidentally" activate restoration and destroy data/files on the hard disk drive. The present embodiments are examined in the following paragraphs in relation to these concerns.

With respect to the usage of between 100 and 200 megabytes of the computer system hard disk space, the software restoration image of the present disclosure consumes approximately on the order of 200 megabytes of hard disk space, preferably near the physical "end" of the HDD. This space at the physical "end" of the HDD will not, however, be removed from the computer user's "available" disk space because the software restoration image file is not placed in the computer system's file directory. The hard disk space is otherwise fully available to the computer user. Note, however, that the software restoration image file's physical placement means that the computer user would only get to that location in the hard disk drive after having "used" substantially all of the preceding hard disk space. With a base computer system configuration for HDD capacity of 2 Gbytes and above, this means that the software restoration image file will be reasonably safe until the customer has filled the hard disk drive storage space substantially well outside of what a customer would typically use within a first 30-day period of system operation.

If the customer does use substantially all of the available hard disk space, then the software restoration image file could likely be overwritten by the customer's operating system without the operating system even being aware of the software restoration image file. If this were to occur, then at that point, the software restoration image and the corresponding restoration utility program become unusable. That is, if the restoration utility program is run after software restoration image file corruption, the restoration utility program will determine that the software restoration image file is corrupted. The restoration utility program can use any suitable routine, for example, a file integrity check or file checksum routine for checking the integrity of the software restoration image file. In the event that software restoration image file corruption is determined, the restoration utility program can report itself to the computer user as being unable to restore the factory download software image. Furthermore, the restoration utility program may thereafter direct the computer user to request a software transport mechanism (STM) CD ROM restore service kit to be dispatched from the computer manufacturer.

With respect to potential corruption of the software restoration image file by the actions that may have damaged the original factory downloaded software image, in accordance with the present disclosure, the software restoration image file is made unaccessible through the standard computer system operating system disk operations. The software restoration image is therefore less susceptible to deviant program/operating system errors. In the event that the software restoration image file is corrupted, overwritten, or damaged in any way from any source, the net result will be that the restoration utility will note the damage. Upon damage detection, the computer user would be directed to request a CD ROM restoration service kit to be shipped from the computer manufacturer, which is no worse than a currently available CD ROM restoration procedure.

With respect to the concern that the software restoration image file could be transferred or posted to a bulletin board, or Internet, for use on other systems, the present embodiments utilize an anti-piracy scheme which includes tying the software restoration image file to a service tag number of the host computer system. The service tag number is a unique identifier of the particular computer system. The service tag number identifies the particular computer system as having particular hardware and software as custom ordered and manufactured, further wherein the service tag number can also be included in the original factory downloaded software image.

With respect to whether or not the hard disk drive factory downloaded software image of the operating system (or the operating system's file structure) is corrupted, the software restoration image file of the present embodiments is accessible as per the following steps. Upon an activation of the restoration utility program, and after a verification that the software restoration image file is not corrupted, a quick format of the hard disk drive is performed. Such a quick format includes certain prescribed "special procedures" to restore the hard disk drive boot sector(s) and force the hidden software restoration image file pointer information and address into the file allocation tables of the boot record. The hidden software restoration image file will then be accessed and a de-compression performed to restore the software restoration image file's contents to the hard disk drive. The restoration utility program then does a "clean up" of the file allocation table to re-hide the software restoration image file, and thereafter continues with a "break-the-seal" portion of a computer user initial install process.

In short, as long as the software restoration image file itself has not been damaged or corrupted, the restoration utility program on the diagnostics diskette can be used to create an environment suitable for the factory downloaded software image's appropriate restoration with the use of the hidden software restoration image. The restoration utility program may also be executed from the HDD, as discussed further herein.

Addressing the concern that a customer might accidentally activate restoration and destroy the data/files on the hard disk drive, the present factory downloaded software image restoration embodiments are activated only by deliberate user action. That is, the restoration utility program must be deliberately activated. The restoration utility program can be provided to the computer user via the computer system diagnostic diskette and/or placed on the hard disk drive as part of the factory downloaded software image. The restoration utility program can also be hidden on the computer system hard disk drive. When included only on the computer system diagnostic diskette, a computer user can only access the restoration utility program via the diagnostics diskette, since the restoration program utility would not otherwise be listed in the file allocation table of the host computer operating system. The restoration program utility also preferably includes providing notification to the computer user of impending reformatting of the hard disk drive and require positive affirmation from the computer user before proceeding.

The original HDD software restoration image is created at the manufacturer or computer factory. The software restoration image is not written to the file allocation tables (FAT) and thus a customer or computer user will never "see" it. As mentioned herein, the customer, and some programs, may overwrite the hard disk drive software restoration image by filling up the HDD space and thereby destroy the restoration utility program's ability to restore the system, wherein a STM CD ROM would then be required for restoration of the hard disk drive. The software restoration image is preferably available for use with all IDE devices, as well as, suitable for SCSI devices.

In a preferred embodiment, prior to shipment, a software restoration image creation program (FIG. 4) is run at the manufacturer for making a copy of the factory download and storing or placing the copy as a hidden image on the HDD, for example, at the high address end of the HDD. With one embodiment of the present disclosure, a guard band is created at the uppermost address portion of the HDD, wherein the protected software restoration image is placed in an upper partition but below the guard band. Except for the hidden software installation image, certain other pieces of information, such as, the master boot record and other things necessary to restore the factory download are otherwise not required to be hidden. The essence of the embodiment is that the restoration software image copy is stored as a hidden image. As a hidden image, the software restoration image is protected, that is, not seen by the operating system, not in a FAT table, and not in a file directory. The hidden image thus includes a set of bits that otherwise do not exist, and therefore viruses or other rogue programs are not able to find the hidden image. In other words, the hidden image does not exist with respect to typical programs.

Further according to the present disclosure, a batch file, hereinafter referred to as "ZZ.BAT" is placed onto the computer system HDD and the diagnostics diskette. The ZZ.BAT file enables an easy, fast, and complete way to restore a custom computer system (i.e., the HDD) to like new factory downloaded software image condition. Implementation of the ZZ.BAT program for restoring the hard disk drive has an effect similar to that of shipping a new hard disk drive with the custom software installation.

Referring now to FIG. 5, one embodiment 80 of the restoration process shall now be briefly discussed. In a first step 82, the image restoration utility program is loaded. The image restoration program is then run. In step 84, the header file is located on the HDD. In step 86, an integrity check is performed on the software restoration image to determine the integrity of the restoration image. In step 88, an inquiry is made as to whether or not the restoration image passed the integrity check. If the image failed the integrity check, then the restoration process is not able to be completed and the process ends at step 90. If the integrity check passed, then in step 92, the master boot record is overwritten. In step 94, all data of the compressed software restoration image is decompressed and written to the HDD. In step 96, the user is instructed to re-boot the system for changes to take effect. The process then ends at step 90. Variations to the restoration process can be implemented, as may be required for a particular restoration.

The restoration utility program is preferably fully functional with all operating systems and with file types FAT 16, FAT32, NT, and NTFS. If the hard disk drive of a given computer system is functional, then so is the restoration program of the present disclosure. The restoration utility program enables restoration of a customer's computer system preferably without the need for STM CD ROM or hardware restoration dispatches from the computer manufacturer. In an effort to strive for the best in quality and customer satisfaction, a computer manufacturer can ship computer systems having the restoration utility program (ZZ.BAT). If a defective drive escapes the factory, then neither ZZ.BAT or an STM CD ROM restoration dispatch will provide a satisfactory solution, that is, only the shipment of a new factory downloaded software image hard disk drive will work in such an instance. With the use of ZZ.BAT, the restoration program provides a renewed full factory download with all drivers and support for the particular custom computer system configuration. Upon execution of the restoration program utility, a customer can have his or her computer system up and running, on average, in about 10 minutes or less.

ZZ.BAT has numerous benefits and advantages. For one, the software restoration utility program is easy to run. ZZ.BAT is preferably designed in a manner to walk a customer through the entire restoration process from essential backups to system restore. The restoration of the hard disk drive is relatively fast. That is, a full system restore with operating system, drivers and full like new factory downloaded software image can be accomplished in approximately less then 10 minutes. The restoration utility program is inexpensive for both the manufacturer and the customer. Use of the restoration utility program and protected software restoration image requires no service paper work, no hard disk drive to order via computer manufacturer customer service, and no STM CD ROM to be prepared and mailed from the computer manufacturer. Use of the software restoration image and restoration utility program according to the present embodiments, in most instances, means that no additional factory downloaded software restoration image is needed to be created. A service call to the computer manufacture may not even be necessary. Everything the customer needs for like new factory download software image restoration, no matter how catastrophic the failure (except in such instances as the protected software restoration image becoming corrupted), is made available on the hard disk drive of the computer system and the diagnostic diskette which is sent with each custom built-to-order computer system.

The protected software restoration image and restoration utility program (ZZ.BAT) together saves time, saves hassles, and saves the customer. The protected software restoration image and restoration utility program provide the easiest, safest, and a most accurate way of restoring a custom computer system. Whether a service call is related to incompatible drivers or to the weekend hacker, the protected software restoration image and restoration utility program can be used for restoring the software image of the computer system to like new factory downloaded condition. Unlike sending hardware or even shipping an STM CD ROM, the protected software restoration image and restoration utility program offers the benefits of getting the computer system up and running quickly. For example, with the present method and apparatus, a normal restore from a reformatted hard disk drive can be accomplished in typically under 10 minutes. With the use of the protected software restoration image and the restoration utility program, a customer can feel like they just brought their computer home for the first time. The computer system has little to no down time, no parts to be ordered, no required 3–5 day wait, and furthermore, the customer is never inconvenienced by intrusive service calls. According to one restoration method of the present disclosure, a customer simply puts the diagnostics diskette into the diskette drive and reboots the computer system. The computer user can then enter the restoration program file name, whereupon the restoration process begins.

The present restoration method is operational even when there is no diagnostic diskette. For instance, if a customer has lost the diagnostics diskette for their particular computer system, then any bootable disk may be used to start up the computer system, for gaining access to the hard disk drive. If the customer is able to access the hard disk drive, then the customer can access the copy of the restoration utility program stored as part of the original factory downloaded software image. As discussed herein, the restoration utility program can be stored on the diagnostics diskette and/or the hard disk drive of the computer system.

With the factory downloaded software restoration image and restoration utility program, the probability that the computer manufacturer will get a repeat service call in connection with restoration of the computer system hard disk drive is reduced. The restoration program preferably includes step by step instructions to reduce errors and resulting delays. Data integrity and numerous error checks ensure that the computer system will work like factory new. Even in the event of a customer corrupting the respective computer system more than once, the customer can run the restoration utility program again and again (so long as the software restoration image remains uncorrupted or not overwritten) for restoring the hard disk drive factory downloaded software image to like new condition.

The restoration utility program provides three simple steps to a fast recovery. In a first step, the ZZ.BAT menu guides the customer through the restore process one step at a time. To start, the customer is directed to get to a DOS prompt, for example, on the C: drive or D: drive. The diagnostic diskette may also be used if the hard drive is not accessible. In one embodiment, the restoration program is hidden on the hard disk drive, in addition to the hidden software restoration image. At the DOS prompt, the computer user enters the restoration utility program file name and presses <ENTER>. The restoration program will then check the hard disk drive for the software restoration image and verifies the restoration image's integrity. In a second step, the customer or computer user is prompted to backup any files that were installed after the initial purchase or that can not be routinely reloaded. Subsequent to making of backup files, the restoration process continues. For a typical 500 megabyte WINDOWS 95™ operating system, which normally takes up to an hour with substantial operator input and support to reload, can be restored in about 5 to 10 minutes in accordance with the present embodiments.

An overview of another embodiment of the restoration process according to the present disclosure is as follows. When a customer encounters, for example, a hard drive "crash" or similar problem, the customer may contact the customer service department of the computer manufacturer for assistance by a customer service technician. The technician can verify that the problem has originated from software corruption and not a hardware problem, the latter requiring a more in-depth service call. Once software corruption has been established, the technician can further instruct the customer how to execute subsequent steps for restoring the customer's system while maintaining hard drive data integrity. The next step includes the use of a bootable diagnostics diskette. The customer inserts the diagnostics diskette into the diskette drive and reboots the computer system to the A: drive using the diagnostics disk. Upon entering a given command, for example, typing "ZZ<ENTER>, access can be obtained to a hidden file A:\ZZ file. If the customer has misplaced the diagnostics disk or otherwise does not have the diskette, then a hidden file may also be located (if available) as C:\ZZ or D:\ZZ. Upon being made aware of the hidden file, a customer may or may not require further assistance from a service technician.

Upon execution and running of the restoration utility program, a simple user interface appears on the computer monitor or display. The user interface presents the user with several options, for example, which may include: 1) run software restoration image integrity check; 2) restore system and hard disk drive to like new factory downloaded software condition, and 3) exit.

Upon selecting the option 1), a software restoration image integrity check is performed, which takes on the order of approximately three (3) minutes to run. During the integrity check, the restoration utility program locates the section of the hard disk drive that holds information about the location and size of the hidden software restoration image. The restoration utility program then goes to the identified section of the hard disk drive and evaluates the integrity of the image. Once the program has determined that the image is good and that the image can be restored, the screen can provide an indication to the computer user that the "image integrity check tested successful" or "integrity check passed". In the event that the image has been written over or otherwise corrupted, the screen can provide an appropriate indication to the computer user that "integrity check failed, contact computer manufacturer customer service technician". If the integrity check failed, then an STM CD ROM remains a viable restoration option. In other words, if the software restoration image has been corrupted and a restoration becomes necessary, then an STM dispatch repair CD is appropriate if the customer has a CD-ROM drive on their system. If the software restoration image has been corrupted and the customer system has no CD ROM drive, then in the event of a restoration becoming necessary, a HDD with factory downloaded software will need to be dispatched, hopefully as a last resort.

Once the software restoration image's integrity has been validated, the process can proceed with restoration of the like new factory downloaded image. Prior to the actual restoration, the customer is prompted to backup files/data that are not factory installed and which can not be otherwise replaced on the hard disk drive. For instance, this can be easily accomplished by selecting the third option (exit to DOS) of the software restore program options. DOS can then be used for producing backup copies of the files/data which were not factory installed.

The restoration process is further implemented by selecting the second option to "restore the system to like factory new condition". Upon selection of the "restore" option, another screen can be displayed, indicating a warning that all data on the hard disk will be erased. If not yet performed and the customer wishes to make backup of data files and non-factory installed programs at that time, then the user can exit this screen for performing any needed backup. Additional secondary options can be presented which might include: 1) proceed with software image restore, and 2) exit to DOS, wherein the user can choose either secondary option 1 or secondary option 2. When the customer activates the "software restore" option, the restoration utility program will once again verify the integrity of the software restoration image. If the software restoration image is considered to be "good", then the program will proceed with the carrying out of the restore process.

The computer display screen can be used to display information about the operating system, partition information, and further illustrate a gauge for showing the dynamic changes on the hard drive as a percentage of restore on one portion of the display screen, while identifying exactly what files are being restored on another portion of the screen. The restoration utility program reduces the time to install a typical 500-megabyte Windows 95™ system from an hour with substantial operator input to less than five (5) minutes, with no operator input or error. A bundled software package which may have been included in the factory download can also be restored, while reformatting and re-partitioning the hard disk drive, in less than on the order of ten (10) minutes. After completion of the restore, the previous screen will vanish and a message such as "Please remove the diagnostic disk and re-boot the computer" may appear. The computer will now have a "like new" factory downloaded hard disk drive software image. The customer will then have to "break-the-seal", whereupon the computer should return to being fully operational. After restoring the hard disk image, the user may choose to reinstall the "backed up" data and/or files.

If a computer system failure is determined to be a software failure, a customer can first attempt to re-install the operating system with use of a generic operating system back-up CD ROM. The operating system generic restore CD ROM can be placed into the CD ROM drive and the customer can attempt to re-install the operating system. Installing of the operating system by the customer does not affect the protected software restoration image at all. However, in the event that catastrophic software failure has occurred and the re-installation of the operating system is not successful, then the customer can execute the restoration of the factory downloaded software image using the restoration method of the present disclosure.

The restoration program (ZZ) may reside on the HDD, or on a diagnostics diskette. Execution of the restoration program causes the restoration of the like new factory download software image on the HDD. The protected restoration software image is copied from its location on the HDD to the lower most segment of the HDD, thereby restoring the software image to like new factory downloaded condition (i.e., original factory downloaded condition of the software installation.

Upon execution of the restoration program, the protected restoration software image is checked to ensure its integrity. If the protected restoration software images fails the integrity check then a directive is issued to contact the computer manufacturer for handling of the restoration of the factory downloaded software image. In such an instance, the computer manufacturer can produce a software transport mechanism (STM) which includes a unique CD having a copy of the factory downloaded software image thereon. The need for providing STM restoration CDS is believed greatly reduced in view of the embodiments of the present disclosure.

Upon a successful integrity check, the protected software image is then restored. During restoration, the master boot record is overwritten. The customer is given an option to back-up any data or program files prior to overwriting the HDD with the restoration software image. During restoration, the protected software restoration image is copied to the lower portion of the HDD. Upon completion of the copying of the restoration software image, the customer is instructed to reboot the computer system for the changes to take effect. Upon rebooting the system, the software image thus being restored to like new factory downloaded condition, the computer thereafter functions as if it were undergoing a power-up for the first time by the computer user subsequent to purchase of the computer system.

Assumptions of the present embodiments are that, with the high storage capacity of the average HDD, overwriting the hidden image is not likely to occur in the first thirty days of the computer system life or customer usage. A primary benefit in the IFIR reduction will occur during the first 30 days of operation before the customer writes data on the high end (e.g., in the second partition) of the hard disk drive, thus overwriting the factory installed software restoration image. The built-to-order computer manufacturing process can accommodate the restoration image creation process as discussed herein without adversely impacting production flow. In addition, the software restoration image is deeply hidden which will make it invisible to most viruses and rogue program dangers. It is unlikely that the software restoration image will be destroyed due to a customer formatting the hard disk drive, as the restoration image will be in a partition above the one where the OS (operating system) and programming are typically stored. The present ZIG/ZAG restoration embodiments advantageously provide a protected software restoration image stored on the HDD which is immune from and not typically subject to most of the factors that lead to corruption of the original factory download software image. With the present embodiments, upon a corruption of the factory download, a user can advantageously restore the factory download to "like new" factory download image condition.

While the method and apparatus of the present disclosure have been particularly shown and described with reference to the various embodiments thereof, it will be understood by those skilled in the art that various changes in form and detail may be made therein without departing from the spirit and scope of the method and apparatus, as set forth in the following claims.

What is claimed is:

1. A computer system having capability for restoration of a hard disk drive, said computer system comprising:
   at least one processor;
   at least one hard disk drive;
   a software image stored on said at least one hard disk drive, said software image including a factory downloaded image which is subject to corruption; and
   a protected software restoration image not prone to a typical corruption, said protected software restoration image being stored on said at least one hard disk drive and available for use by said at least one processor in executing the restoration of said software image on said at least one hard disk drive to a like new factory downloaded image condition.

2. The computer system of claim 1, wherein said protected software restoration image is deeply hidden on said at least one hard disk drive.

3. The computer system of claim 1, wherein said protected software restoration image is stored on an unpartitioned area of said at least one hard disk drive.

4. The computer system of claim 1, wherein said protected software restoration image is stored on a partitioned area of said at least one hard disk drive, further wherein pointer information relating to a location of said protected software restoration image is stored in a master block boot record of said at least one hard disk drive with the use of non-standard encoding codes.

5. The computer system of claim 1, wherein said protected software restoration image is stored as a contiguous image.

6. The computer system of claim 1, wherein said protected software restoration image is stored as a non-contiguous image.

7. The computer system of claim 1, further comprising:
   a software transport mechanism having a restoration program disposed thereon, the restoration program including instructions for causing said at least one processor to execute the restoration of said software image on said at least one hard disk drive to the like new factory downloaded image condition with said protected software restoration image.

8. The computer system of claim 7, wherein said software transport mechanism includes said at least one hard disk drive, further wherein the restoration program is included in the factory downloaded software image.

9. The computer system of claim 7, wherein said software transport mechanism includes a bootable diagnostics diskette.

10. A computer system having capability for restoration of a hard disk drive, said computer system comprising:
    at least one processor;
    at least one hard disk drive;
    a software image stored on said at least one hard disk drive, said software image including a factory downloaded image which is subject to corruption;
    a protected software restoration image not prone to a typical corruption, said protected software restoration image being stored on said at least one hard disk drive and available for use by said at least one processor in executing the restoration of said software image on said at least one hard disk drive to a like new factory downloaded image condition; and
    a software transport mechanism having a restoration program disposed thereon, the restoration program including instructions for causing said at least one processor to execute the restoration of said software image on said at least one hard disk drive to the like new factory downloaded image condition with said protected software restoration image.

11. The computer system of claim 10, wherein said protected software restoration image is deeply hidden on said at least one hard disk drive.

12. The computer system of claim 10, wherein said protected software restoration image is stored on an unpartitioned area of said at least one hard disk drive.

13. The computer system of claim 10, wherein said protected software restoration image is stored on a partitioned area of said at least one hard disk drive, further wherein pointer information relating to a location of said protected software restoration image is stored in a master block boot record of said at least one hard disk drive with the use of non-standard encoding codes.

14. The computer system of claim 10, wherein said protected software restoration image is stored as a contiguous image.

15. The computer system of claim 10, wherein said protected software restoration image is stored as a non-contiguous image.

16. The computer system of claim 10, wherein said software transport mechanism includes said at least one hard disk drive, further wherein the restoration program is included in the factory downloaded software image.

17. The computer system of claim 10, wherein said software transport mechanism includes a bootable diagnostics diskette.

18. A method for implementing restoration of a hard disk drive in a computer system, said method comprising:
    providing at least one processor;
    providing at least one hard disk drive;
    storing a software image on said at least one hard disk drive, the software image including a factory downloaded image which is subject to corruption; and
    storing a protected software restoration image on the at least one hard disk drive, the protected software restoration image not prone to a typical corruption and being available for use by the at least one processor in executing the restoration of the software image on the at least one hard disk drive to a like new factory downloaded image condition.

19. The method of claim 18, wherein the protected software restoration image is stored as a deeply hidden image on the at least one hard disk drive.

20. The method of claim 18, wherein the protected software restoration image is stored on an unpartitioned area of the at least one hard disk drive.

21. The method of claim 18, wherein the protected software restoration image is stored on a partitioned area of the at least one hard disk drive, said method further comprising the step of:

storing pointer information relating to a location of the protected software restoration image in a master block boot record of the at least one hard disk drive with the use of non-standard encoding codes.

22. The method of claim 18, wherein the protected software restoration image is stored as a contiguous image.

23. The method of claim 18, wherein the protected software restoration image is stored as a non-contiguous image.

24. The method of claim 18, further comprising the step of:

providing a software transport mechanism having a restoration program disposed thereon, the restoration program including instructions for causing the at least one processor to execute the restoration of the software image on the at least one hard disk drive to the like new factory downloaded image condition with the protected software restoration image.

25. The method of claim 24, wherein the software transport mechanism includes the at least one hard disk drive, further wherein the restoration program is included in the factory downloaded software image.

26. The method of claim 24, wherein the software transport mechanism includes a bootable diagnostics diskette.

27. A method for implementing restoration of a hard disk drive in a computer system, said method comprising:

providing at least one processor;

providing at least one hard disk drive;

storing a software image on said at least one hard disk drive, the software image including a factory downloaded image which is subject to corruption;

storing a protected software restoration image on the at least one hard disk drive, the protected software restoration image not prone to a typical corruption and being available for use by the at least one processor in executing the restoration of the software image on the at least one hard disk drive to a like new factory downloaded image condition; and providing a software transport mechanism having a restoration program disposed thereon, the restoration program including instructions for causing the at least one processor to execute the restoration of the software image on the at least one hard disk drive to the like new factory downloaded image condition with the protected software restoration image.

28. The method of claim 27, wherein the protected software restoration image is stored as a deeply hidden image on the at least one hard disk drive.

29. The method of claim 27, wherein the protected software restoration image is stored on an unpartitioned area of the at least one hard disk drive.

30. The method of claim 27, wherein the protected software restoration image is stored on a partitioned area of the at least one hard disk drive, said method further comprising the step of:

storing pointer information relating to a location of the protected software restoration image in a master block boot record of the at least one hard disk drive with the use of non-standard encoding codes.

31. The method of claim 27, wherein the protected software restoration image is stored as a contiguous image.

32. The method of claim 27, wherein the protected software restoration image is stored as a non-contiguous image.

33. The method of claim 27, wherein the software transport mechanism includes the at least one hard disk drive, further wherein the restoration program is included in the factory downloaded software image.

34. The method of claim 27, wherein the software transport mechanism includes a bootable diagnostics diskette.

* * * * *